(12) United States Patent
Kurosawa

(10) Patent No.: US 6,914,712 B2
(45) Date of Patent: Jul. 5, 2005

(54) MIRROR DEVICE, OPTICAL SWITCH, ELECTRONIC INSTRUMENT AND MIRROR DEVICE DRIVING METHOD

(75) Inventor: Ryuichi Kurosawa, Okaya (JP)

(73) Assignee: Seiko Epson Corporation, Tokyo (JP)

(*) Notice: Subject to any disclaimer, the term of this patent is extended or adjusted under 35 U.S.C. 154(b) by 50 days.

(21) Appl. No.: 10/666,334

(22) Filed: Sep. 22, 2003

(65) Prior Publication Data

US 2004/0207939 A1 Oct. 21, 2004

(30) Foreign Application Priority Data

Sep. 26, 2002 (JP) ........................................ 2002-281084

(51) Int. Cl.$^7$ .......................... G02B 26/00; G02B 26/08
(52) U.S. Cl. ....................... 359/295; 359/291; 359/226; 359/224
(58) Field of Search ................................. 359/224, 225, 359/226, 290, 291, 872; 385/16

(56) References Cited

U.S. PATENT DOCUMENTS

| | | | | |
|---|---|---|---|---|
| 5,554,851 A | * | 9/1996 | Hirai et al. | 250/442.11 |
| 5,959,760 A | * | 9/1999 | Yamada et al. | 359/224 |
| 5,999,303 A | * | 12/1999 | Drake | 359/224 |
| 6,438,282 B1 | * | 8/2002 | Takeda et al. | 385/16 |
| 6,603,591 B2 | * | 8/2003 | Mori | 359/295 |
| 6,614,581 B2 | * | 9/2003 | Anderson | 359/295 |
| 6,747,786 B2 | * | 6/2004 | Murakami et al. | 359/291 |

FOREIGN PATENT DOCUMENTS

| | | |
|---|---|---|
| JP | 09-159937 | 6/1997 |
| JP | 2001-311900 | 11/2001 |

OTHER PUBLICATIONS

T. Yasuda et al., "CMOS Drivable Electrostatic Microactuator with Large Deflection", *Proceedings of "MEMS" 97*, Jan. 26, 1997, pp. 90–95.

* cited by examiner

Primary Examiner—Ricky D. Shafer
(74) Attorney, Agent, or Firm—Oliff & Berridge, PLC (57) ABSTRACT

To provide a mirror device, an optical switch, an electronic instrument, and a mirror device driving method in which a large driving displacement can be produced for a mirror with a smaller driving force, a silicon substrate includes: at least one first mirror-side operating region integrally formed with the mirror and provided at a different position from the mirror; and at least one second mirror-side operating region provided at an end portion of the mirror, and a glass substrate includes: an opposite-side operating section, a coulomb force acting between the first mirror-side operating region and the opposite-side operating section; and another opposite-side operating section, the coulomb force acting between the second mirror-side operating region and the other opposite-side operating section. The glass substrate is formed so that a gap between the first mirror-side operating region and the opposite-side operating section is narrower than a gap between the second mirror-side operating region and the opposite-side operating section.

10 Claims, 4 Drawing Sheets

MIRROR DEVICE, OPTICAL SWITCH, ELECTRONIC INSTRUMENT AND MIRROR DEVICE DRIVING METHOD

Japanese Patent Application No. 2002-281084 filed on Sep. 26, 2002 is hereby incorporated by reference in its entirety.

BACKGROUND OF THE INVENTION

The present invention relates to a mirror device, an optical switch, an electronic instrument, and a mirror device driving method.

One problem when driving a mirror device is how to produce a large displacement for a mirror with a smaller driving force.

In order to solve this problem, Japanese Patent Application Laid-Open No. 2001-311900 proposes an optical scanning apparatus that is equipped with opposing electrodes that have inclined surfaces on their lower surfaces in a mirror driving direction, with grooves being provided in the incline direction of these inclined surfaces.

When the driving force for driving the mirror device is provided electrostatically by a coulomb force, for example, the driving force is dependent on distance in that the driving force increases as the distance between the electrodes decreases and decreases as the distance between the electrodes increases.

Accordingly, although it is believed that the technology of Japanese Patent Application Laid-Open No. 2001-311900 can be applied when the slopes are gradual, the distance between the mirror and the counter electrodes increases as the slope angles increase, so that a larger driving force becomes necessary. In this way, it is not possible to suitably solve the problem of producing a larger driving effect to a mirror with a smaller driving force.

In view of the above problem, the present invention is intended to provide a mirror device, an optical switch, an electronic instrument, and a mirror device driving method that can produce a larger driving effect to a mirror with a smaller driving force.

BRIEF SUMMARY OF THE INVENTION

In order to solve the stated problem, a mirror device according to one aspect of the present invention includes a mirror substrate having a mirror which is driven by a predetermined distance-dependent driving force and a support substrate which supports the mirror substrate, wherein the mirror substrate includes:

at least one first mirror-side operating region on which the distance-dependent driving force acts, the first mirror-side operating region being integrally formed with the mirror and provided at a different position from the mirror; and at least one second mirror-side operating region on which the distance-dependent driving force acts, the second mirror-side operating region being provided at least one of one end of the mirror in a direction in which the mirror is driven and an opposite end of the mirror that is opposite the one end, wherein the support substrate includes:

at least one first opposite-side operating section, the distance-dependent driving force acting between the first opposite-side operating section and the first mirror-side operating region; and at least one second opposite-side operating section, the distance-dependent driving force acting between the second opposite-side operating section and the second mirror-side operating region, wherein the first and second mirror-side operating regions and the first and second opposite-side operating sections are formed so that an attractive force is generated as at least part of the distance-dependent driving force, and wherein at least one of the mirror substrate and the support substrate is formed so that a gap between the first mirror-side operating region and the first opposite-side operating section is narrower than a gap between the second mirror-side operating region and the second opposite-side operating section.

An optical switch according to another aspect of the present invention includes the above-described mirror device and switches an optical path by driving the mirror.

An electronic instrument according to a further aspect of the present invention includes the above-described mirror device.

A mirror device driving method according to a still further aspect of the present invention is a method for driving a mirror device including a mirror substrate having a mirror which is driven by a predetermined distance-dependent driving force and a support substrate which supports the mirror substrate, the method comprising;

acting the distance-dependent driving force between at least part of the mirror substrate and at least part of the support substrate;

forming the mirror substrate and the support substrate so that a gap between a part of the mirror substrate positioned away from the mirror and a part of the support substrate positioned opposite to the part of the mirror substrate positioned away from the mirror is narrower than a gap between the mirror and a part of the support substrate positioned opposite to the mirror;

gradually narrowing gaps between parts of the mirror substrate and parts of the support substrate positioned opposite to the parts of the mirror substrate so that the gap between the mirror and the part of the support substrate positioned opposite to the mirror becomes narrower, by generating the distance-dependent driving force towards the mirror from the part of the mirror substrate positioned away from the mirror and the part of the support substrate positioned opposite to the part of the mirror substrate positioned away from the mirror; and driving the mirror by generating the distance-dependent driving force between the mirror and the part of the support substrate positioned opposite to the mirror in a state that the gap between the mirror and the part of the support substrate positioned opposite to the mirror has been narrowed.

According to a mirror device or the like of the present invention, when a mirror is driven by a distance-dependent driving force (for example, a coulomb force or an electromagnetic force, or the like), the distance-dependent driving force is generated towards the mirror side from a part of the mirror substrate positioned away from the mirror and a part of the support substrate positioned opposite that part of the mirror substrate, so that gaps between parts of the mirror substrate and parts of the support substrate positioned opposite to that parts of the mirror substrate gradually narrow, whereby it is possible to narrow a gap between the mirror and a part of the support substrate positioned opposite to the mirror.

In this mirror device or the like, in a state where the gap between the mirror and the part of the support substrate positioned opposite to the mirror has been narrowed, it is possible to drive the mirror by generating a distance-dependent driving force between the mirror and the part of the support substrate positioned opposite to the mirror.

That is, when the mirror is driven, the gap between the mirror and the support substrate is narrower than in the initial state, so that it is possible to drive the mirror in the mirror device or the like, using a smaller driving force.

In the process up to where the mirror is driven, the gap between the mirror substrate and the support substrate can be gradually narrowed from positions away from the mirror towards the mirror, so that it is possible to drive the mirror in the mirror device or the like, with a smaller driving force.

It should be noted that the method used to generate the distance-dependent driving force or attractive force is as follows. When a coulomb force is used as the distance-dependent driving force, for example, a method that generates a potential difference between the mirror-side operating region and the opposite-side operating section may be used. When an electromagnetic force is used as the distance-dependent driving force, a method that sets opposite polarities (north polarity with south polarity, for example) for the mirror-side operating regions and opposite-side operating sections may be used.

The method used to stop the distance-dependent driving force or attractive force is as follows. When a coulomb force is used as the distance-dependent driving force, for example, a method that equalizes the potentials of the mirror-side operating regions and the opposite-side operating sections may be used. When an electromagnetic force is used as the distance-dependent driving force, a method that sets the same polarities (a north pole with a north pole and a south pole with a south pole, for example) for the mirror-side operating regions and opposite-side operating sections may be used.

In the mirror device, the optical switch, and the electronic instrument described above, the first and second mirror-side operating regions and the first and second opposite-side operating sections may be formed so that generation of an attractive force that is generated between the first mirror-side operating region and the first opposite-side operating section stops in order to restore a part of the mirror substrate other than the mirror to an original position, in a state that an attractive force is acting between the second mirror-side operating region and the second opposite-side operating section.

The mirror device driving method described above may include driving the mirror by stopping generation of the distance-dependent driving force that is generated between a part of the mirror substrate other than the mirror and a part of the support substrate positioned opposite to the part of the mirror substrate other than the mirror, and widening a gap between the part of the mirror substrate positioned away from the mirror and the part of the support substrate positioned opposite to the part of the mirror substrate positioned away from the mirror, in a state that a gap between the mirror and the part of the support substrate positioned opposite to the mirror has been narrowed.

According to the above feature, in a mirror device or the like, a part of the mirror substrate other than the mirror can be separated from the support substrate in a state that the gap between the mirror and the part of the support substrate positioned opposite to the mirror is narrowed, so that the mirror can be tilted by a greater amount.

Accordingly, in a mirror device or the like, a larger driving effect to a mirror can be produced with a smaller driving force.

In the mirror device, the optical switch, and the electronic instrument described above, the support substrate may be formed as a step-like shape so that the gap between the first mirror-side operating region and the first opposite-side operating section is narrower than the gap between the second mirror-side operating region and the second opposite-side operating section.

By forming the support substrate as a step-like shape, it is possible for the mirror substrate in a mirror device or the like to approach the support substrate gradually.

In the mirror device, the optical switch, and the electronic instrument described above, the mirror substrate may be formed in the shape of a flat plate and the opposite-side operating sections may be provided on the respective steps of the step-shaped support substrate, for example.

In the mirror device, the optical switch, and the electronic instrument described above, a plurality of the first mirror-side operating regions may be disposed at a predetermined interval in a direction intersecting with a direction in which the mirror is driven, and a gap between the first mirror-side operating region positioned farthest from the mirror and corresponding one of the first opposite-side operating sections may be narrower than a gap between the first mirror-side operating region positioned closest to the mirror and corresponding one of the first opposite-side operating sections, so that a gap between the second mirror-side operating region and the second opposite-side operating section is gradually narrowed by causing an attractive force to act between the first mirror-side operating regions and the first opposite-side operating sections in order from the first mirror-side operating region positioned farthest from the mirror to the first mirror-side operating region positioned closest to the mirror.

By providing a plurality of first mirror-side operating regions and first opposite-side operating sections, compared with the case that only one of each is provided, the gaps between the first mirror-side operating regions and the first opposite-side operating sections can be made narrower and the gaps between the second mirror-side operating region and second opposite-side operating section can be set wider, so that it is possible for a mirror device or the like, to produce a larger driving effect to a mirror with a smaller driving force.

In the mirror device, the optical switch, and the electronic instrument, the mirror substrate may include a rotational shaft portion which is integrally formed with the mirror and rotatably supports the mirror, and a plurality of the first mirror-side operating regions may be formed on an axis of the rotational shaft portion on two opposed sides of the mirror.

In the mirror device driving method described above, the mirror substrate may include a rotational shaft portion which supports the mirror so that the mirror is rotatable, and when the gap between the part of the mirror substrate positioned away from the mirror and the part of the support substrate positioned opposite to the part of the mirror substrate positioned away from the mirror widens, the mirror may be rotated by moving the rotational shaft portion away from the support substrate in a state that one end of the mirror has been brought close to the support substrate.

With the above feature, in a mirror device or the like, the rotational shaft portion can twist and the mirror can be rotationally driven by causing the mirror to gradually approach the support substrate via the rotational shaft portion, and separating a part of the mirror substrate other than the mirror from the support substrate in a state that the mirror is close to the support substrate.

In the mirror device, the optical switch, the electronic instrument, and the mirror device driving method described above, the distance-dependent driving force may be a coulomb force.

In the mirror device, the optical switch, and the electronic instrument described above, at least one of the first and second mirror-side operating regions and the first and second opposite-side operating sections may be electrodes.

According to this feature, it is possible in a mirror device or the like, to produce a large driving effect to a mirror by using a coulomb force (electrostatic force), even when driving with a low voltage. By using an electrostatic driving method in a mirror device or the like, it is possible to reduce heat generation and power consumption required for driving the mirror.

In the mirror device, the optical switch, the electronic instrument, and the mirror device driving method described above, the mirror substrate may be a conductive silicon substrate.

In this case, it is possible for a mirror device or the like, to electrostatically drive the mirror device using the conductive silicon substrate, without using electrodes for the mirror substrate.

DETAILED DESCRIPTION OF THE EMBODIMENT

The following describes, with reference to the attached drawings, an example where the present invention is applied to a mirror device that switches an optical path according to a tilting of a mirror. Note that the embodiments described hereunder do not in any way limit the scope of the invention defined by the claims laid out herein. Note also that all of the elements of the embodiments described below should not be taken as essential requirements to the means of the invention defined by the claims.

Embodiment

Figure 1:
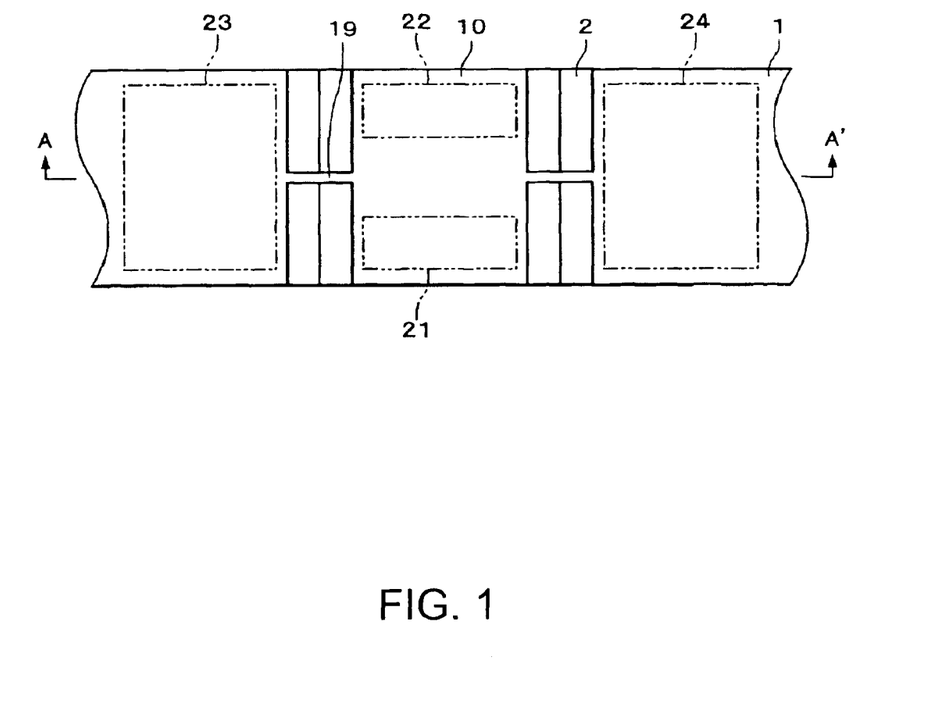
FIG. 1 is a plan view showing a mirror device according to one embodiment of the present invention.

FIG. 1 is a plan view showing a mirror device according to one embodiment. FIGS. 2A to 2D are cross-sectional views of the mirror device according to this embodiment, with FIG. 2A being a cross-sectional view of the mirror device in an initial state, FIG. 2B being a cross-sectional view of the mirror device in a state where a part of a silicon substrate 1 other than a mirror 10 have been attracted towards a glass substrate 2, FIG. 2C being a cross-sectional view of the mirror device in a state where the mirror 10 has been attracted towards the silicon substrate 1, and FIG. 2D being a cross-sectional view of the mirror device in a state where the part of the silicon substrate 1 other than the mirror 10 have been separated from the glass substrate 2. FIGS. 3A to 3D are perspective views of the mirror device according to this embodiment, with FIG. 3A being a perspective view of the mirror device in the initial state, FIG. 3B being a perspective view of the mirror device in the state where the part of the silicon substrate 1 other than the mirror 10 have been attracted towards the glass substrate 2, FIG. 3C being a perspective view of the mirror device in the state where the mirror 10 has been attracted towards the silicon substrate 1, and FIG. 3D being a perspective view of the mirror device in the state where the part of the silicon substrate 1 other than the mirror 10 have been separated from the glass substrate 2.

First, the following describes the construction of the mirror device of this embodiment.

The mirror device of this embodiment includes the silicon substrate 1, which is a mirror substrate with a mirror 10 that is driven by a coulomb force (one type of distance-dependent driving force), and the glass substrate 2, which is a support substrate that supports the silicon substrate 1.

Parts of the silicon substrate 1 function as first mirror-side operating regions that are acted upon by coulomb forces, are integrally formed with the mirror 10, and are provided on both sides of the mirror 10 via hinges 19 that are rotational shaft portions.

Two end portions of the mirror 10 in the driving direction function as second mirror-side operating regions.

The glass substrate 2 is constructed so as to include: opposite-side operating sections 23 and 24 which function as first opposite-side operating sections, coulomb forces acting between the first mirror-side operating regions and the first opposite-side operating sections; and other opposite-side operating sections 21 and 22 which function as second opposite-side operating sections, coulomb forces acting between the second mirror-side operating regions and the second opposite-side operating sections.

The glass substrate 2 is formed as a step-like shape so that the gaps between the first mirror-side operating regions and the first opposite-side operating sections is narrower than the gaps between the second mirror-side operating regions and the second opposite-side operating sections.

Figure 2A:
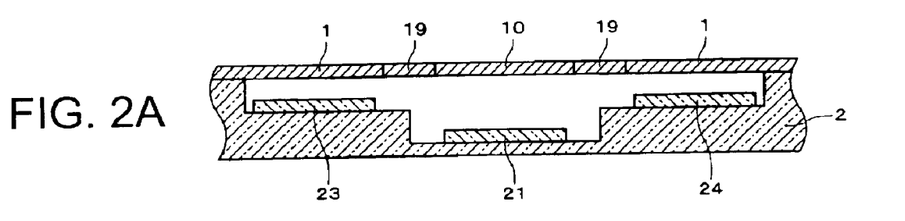
FIGS. 2A to 2D are cross-sectional views of the mirror device according to this embodiment, with FIG. 2A being a cross-sectional view of the mirror device in an initial state, FIG. 2B being a cross-sectional view of the mirror device in a state where a part of a silicon substrate other than a mirror have been attracted towards a glass substrate, FIG. 2C being a cross-sectional view of the mirror device in a state where the mirror has been attracted towards the glass substrate, and FIG. 2D being a cross-sectional view of the mirror device in a state where the part of the silicon substrate other than the mirror have been separated from the glass substrate.

That is, as shown in FIG. 2A, the gaps between the silicon substrate 1 and the first opposite-side operating sections 23 and 24 are narrower than the gaps between the mirror 10 and the second opposite-side operating sections 21 and 22.

The opposite-side operating sections 21 to 24 are formed as electrodes and can be set so that a voltage is turned on or turned off.

That is, the mirror-side operating regions and the opposite-side operating sections 21 to 24 function as so-called "parallel-plate electrostatic actuators". This means that coulomb forces (electrostatic forces) that are one kind of distance-dependent driving force (a force whose effect weakens as distance increases) act between the mirror-side operating regions and the opposite-side operating sections 21 to 24.

It should be noted that the following are examples of the materials that may be used to realize this kind of mirror device.

As one example, a low-resistivity (0.1Ω·cm) silicon substrate can be used as the silicon substrate 1 with the lower part of the silicon substrate 1 being coated with a film of $SiO_2$ as an insulating film. As one example, borosilicate sodium glass or the like may be used as the glass substrate 2. The same material as the silicon substrate 1, for example, may be used as the mirror 10, or aluminum or the like may be used as the mirror 10 and transparent electrodes of ITO or the like may be used as the mirror-side operating regions.

In the same way, as one example, transparent electrodes of ITO or the like may be used as the opposite-side operating sections 21 to 24.

It should be noted that standard micromachining techniques can be used as the manufacturing method for the mirror device of this embodiment and as one example, the method disclosed by Japanese Laid-Open Patent Publication No. H09-159937 may be used. In particular, by using a micromachining technique, the mirror device can be easily miniaturized.

Next, the operation of the mirror device of this embodiment is described using a flowchart.

Figure 4:
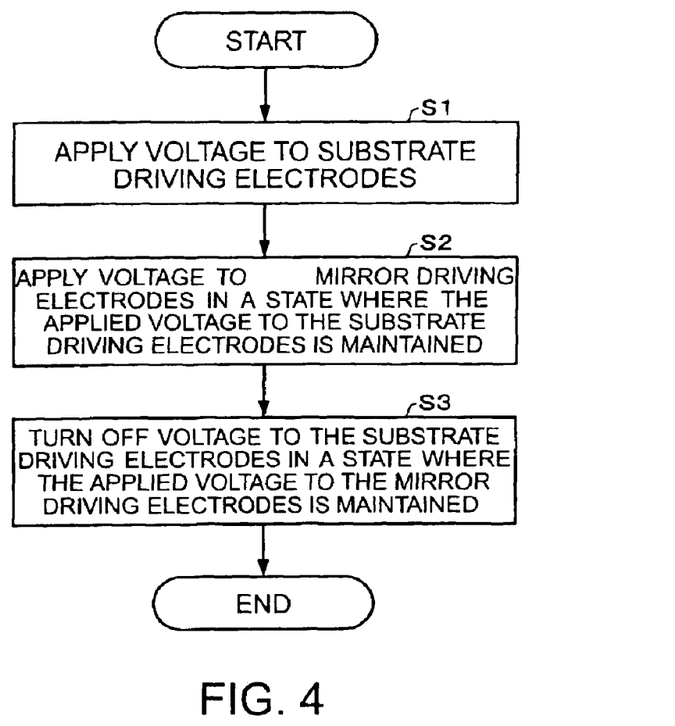
FIG. 4 is a flowchart showing the operation of the mirror device according to this embodiment during driving.

FIG. 4 is a flowchart showing the operation of the mirror device according to this embodiment during driving.

Figures 3A, 3B, 3C, 3D:
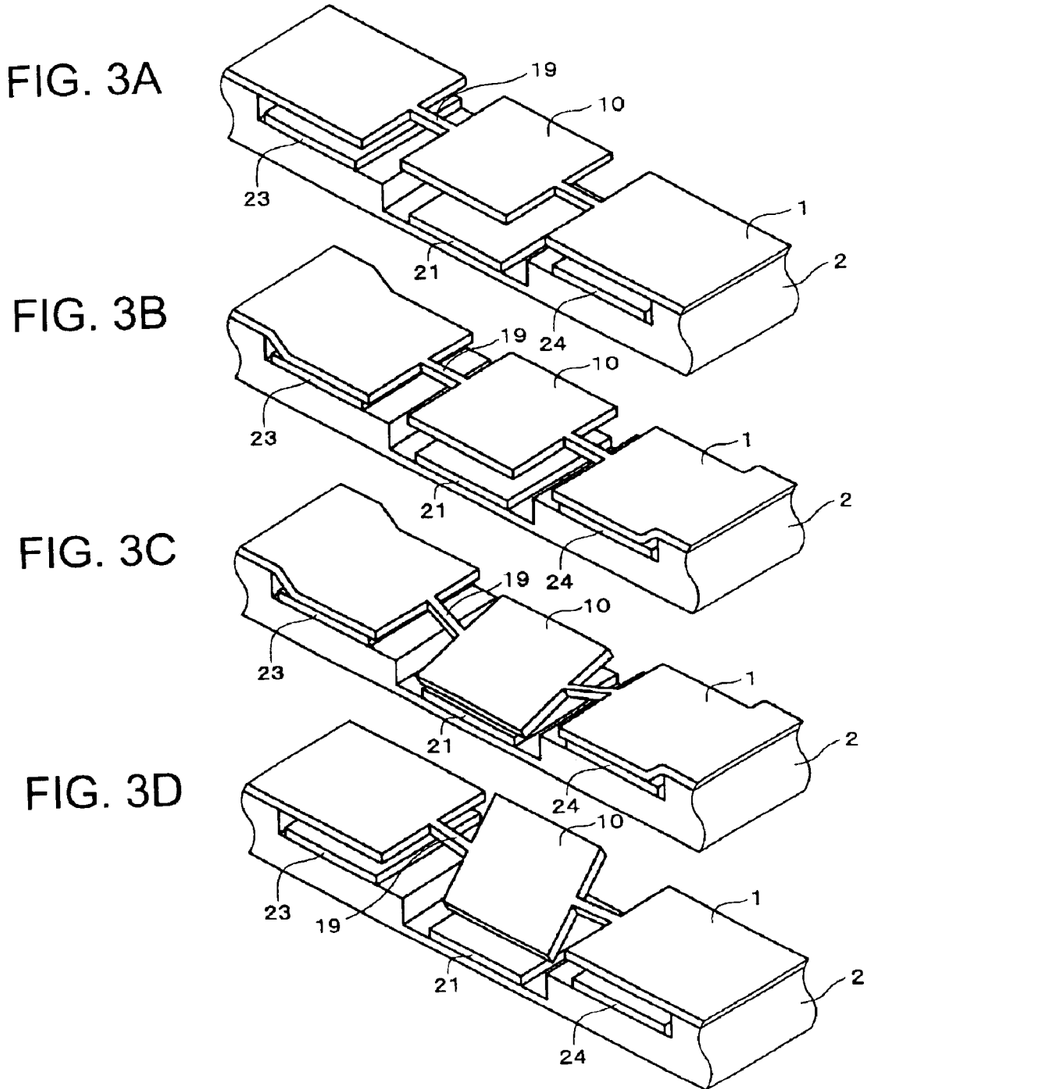
FIGS. 3A to 3D are perspective views of the mirror device according to this embodiment, with FIG. 3A being a perspective view of the mirror device in the initial state, FIG. 3B being a perspective view of the mirror device in the state where the part of the silicon substrate other than the mirror have been attracted towards the glass substrate, FIG. 3C being a perspective view of the mirror device in the state where the mirror has been attracted towards the glass substrate, and FIG. 3D being a perspective view of the mirror device in the state where the part of the silicon substrate other than the mirror have been separated from the glass substrate.

As shown in FIG. 2A and FIG. 3A, all of the opposite-side operating sections 21 to 24 have been set to off in the initial state.

In the initial state, voltages are applied in the mirror device to the opposite-side operating sections 23 and 24, which are the substrate driving electrodes that drive the silicon substrate 1 (step S1).

Figure 2B:
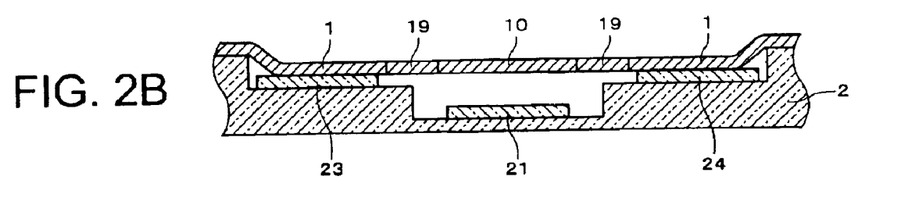

By doing so, coulomb forces are generated between the first mirror-side operating regions and the opposite-side operating sections 23 and 24, and as shown in FIG. 2B and FIG. 3B, the parts of the silicon substrate 1 that are not tightly attached to the glass substrate 2, the hinges 19, and the mirror 10 approach the glass substrate 2, and the parts of the silicon substrate 1 that function as the first mirror-side operating regions are placed in a state where these parts are in tight contact with the opposite-side operating sections 23 and 24.

The applied voltages for the substrate driving electrodes are maintained with the mirror device in this state, and a voltage is applied to the opposite-side operating section 21 that is a mirror driving electrode (step S2).

Figure 2C:
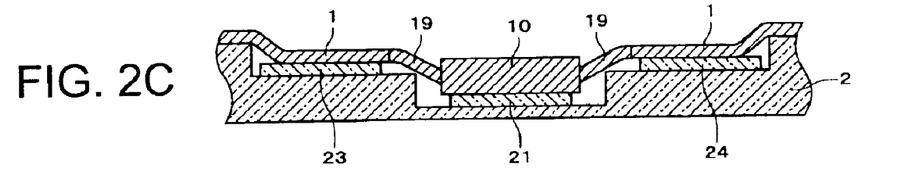

By doing so, a coulomb force is generated between the second mirror-side operating region and the opposite-side operating section 21, and as shown in FIG. 2C and FIG. 3C, the hinges 19 and mirror 10 that are not tightly attached to the glass substrate 2 approach the glass substrate 2, so that one end of the mirror 10 that functions as a second mirror-side operating region is placed in a state where this part is in tight contact with the opposite-side operating section 21.

Next, with the mirror device in this state and the voltage being maintained for the mirror driving electrode, the applied voltages for the opposite-side operating sections 23 and 24, which are the substrate driving electrodes, are turned off (step S3).

By doing so, in the state where a coulomb force is generated between one of the second mirror-side operating regions and the opposite-side operating section 21, the generation of the coulomb forces that were generated between the first mirror-side operating regions and the opposite-side operating sections 23 and 24 stops.

Figure 2D:
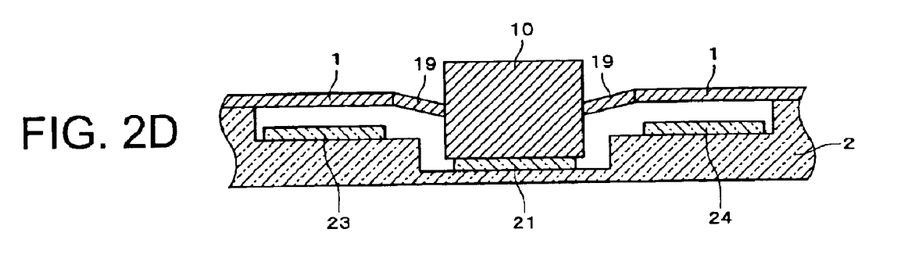

By doing so, as shown in FIG. 2D and FIG. 3D, the regions of the silicon substrate 1 that function as the first mirror operating regions are separated from the glass substrate 2 and the hinges 19 become twisted with the end portion of the mirror 10 still in tight contact with the opposite-side operating section 21, so that the mirror 10 is placed in a rotated state.

As shown in FIG. 3D, this action greatly tilts the mirror 10 to the opposite-side operating section 21 side.

In this way, the mirror device is provided with steps in a different direction to the driving direction of the mirror 10, the mirror 10 approaches the opposite-side operating section 21 gradually, and by lifting up the hinges 19 in a state where one end portion of the mirror 10 is in tight contact with the opposite-side operating section 21, the mirror 10 can be greatly tilted by a small driving force.

The voltage that is required when holding the mirror 10 in tight contact with the opposite-side operating section 21 may be a smaller voltage than that used when moving the mirror 10.

Figure 5:
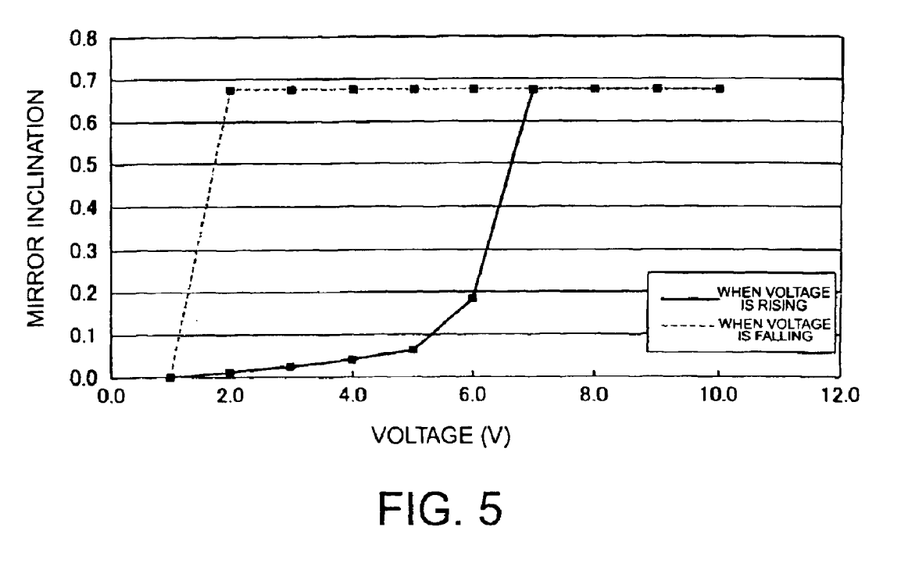
FIG. 5 is a graph showing the relationship between voltage and the tilting of the mirror in one embodiment of this embodiment.

FIG. 5 is a graph showing the relationship between voltage and the tilting of the mirror 10 in this embodiment.

As shown in FIG. 5, the maximum degree of tilting of the mirror 10 is around 0.68, and while a voltage of 7V is necessary to drive the mirror 10 to produce that tilting when an increasing voltage is used, the voltage may drop to around 2V to maintain that tilting.

As described above, according to this embodiment, when the mirror device is driven using coulomb forces, coulomb forces are generated towards the mirror 10 side from parts of the silicon substrate 1 positioned away from the mirror and parts of the glass substrate 2 that are positioned opposite such parts of the silicon substrate 1, so that the gaps between these parts of the silicon substrate 1 and the opposite-side operating sections 23 and 24 that are opposite the silicon substrate 1 gradually become narrower. Further, the gaps between the mirror 10 and the opposite-side operating sections 21 and 22 that are positioned opposite to the mirror 10 can also become narrower.

Next, in the state where the gaps between the mirror 10 and the opposite-side operating sections 21 and 22 have been narrowed, the mirror 10 of the mirror device can be driven by generating a coulomb force between the mirror 10 and the opposite-side operating section 21.

That is, when the mirror 10 is driven, the gap between the mirror 10 and the opposite-side operating section 21 is a narrower than that in the initial state, so that the mirror 10 in the mirror device can be driven with a smaller driving force.

In the process up to when the mirror 10 is driven, the gap between the silicon substrate 1 and the glass substrate 2 can be gradually narrowed towards the mirror 10 from positions that are distant from the mirror 10, so that the mirror 10 can be placed in a state where driving is possible with a smaller driving force.

According to this embodiment, in the state where the gap between the mirror 10 and the opposite-side operating section 21 is narrow, part of the silicon substrate 1 other than the mirror 10 can be raised upwards from the opposite-side operating sections 23 and 24, so that the mirror 10 in the mirror device can be tilted more.

Accordingly, in this mirror device, a larger driving effect can be produced for the mirror 10 with a smaller driving force.

In this mirror device, by rotationally driving the mirror 10 via the hinges 19, the hinges 19 can twist and the mirror 10 can be rotationally driven.

In the mirror device, by electrostatically driving the mirror 10 and the like using coulomb forces, reductions can be made in power consumption and in heat generation.

Additionally, by forming the mirror substrate as a conductive silicon substrate 1, there is no need to provide electrodes on the mirror 10 and the silicon substrate 1, so that it is possible to further reduce power consumption and heat generation.

Modifications

Although the present invention has been described above by means of a preferred embodiment, the present invention is not limited to the embodiment described above and various modifications are possible.

As one example, in the embodiment described above, one of the first mirror-side operating regions and one of the opposite-side operating sections 23 and 24 are provided on both sides of the mirror 10, but a plurality of such parts may be provided on both sides of the mirror 10 and the number of steps in the glass substrate 2 may be increased in accordance with the number of first opposite-side operating sections.

By doing so, by providing a plurality of first mirror-side operating regions and first opposite-side operating sections, compared to a case where one pair of each is provided, it is possible to set the gaps between the first mirror-side operating regions and the first opposite-side operating sections narrower and the gaps between the second mirror-side operating regions and the second opposite-side operating sections wider, so that it is possible in the mirror device to produce a larger driving effect to the mirror 10 with a smaller driving force.

In this case, it is possible to separately apply a coulomb force to each set of a first mirror-side operating region and a first opposite-side operating section so that it is possible in the mirror device to control the tilting angle of the mirror 10 in stages.

In addition, since it is possible in this case to stop the generation of a coulomb force between each set of a first mirror-side operating region and a first opposite-side operating section, in the mirror device, instead of raising the parts of the silicon substrate 1 other than the mirror 10 in a single operation, it is possible to raise the silicon substrate 1 gradually starting from the positions that are distant from the mirror 10 so as to restore the silicon substrate 1 to the original state. By doing so, it is possible to reduce the shocks upon the mirror 10, so that the mirror 10 in the mirror device can be driven stably.

As another example, in the embodiment described above, an electrostatic actuator is provided at both ends of the mirror 10, though it is possible for one side of the mirror 10 to be fixed and for an electrostatic actuator to be provided on the other side. That is, the present invention may be also applied to a so-called "cantilever beam mirror device". In this case, an electrode is provided only at a position that is opposite the electrostatic actuator and it is not necessary to provide an electrode at a position that is opposite the side where there is no electrostatic actuator.

As another example, although the same material as the silicon substrate 1 was used for the mirror 10 and the mirror-side operating regions in the embodiment described above, electrodes may be provided on each of the mirror 10 and the mirror-side operating regions and voltages may be applied to these electrodes, not to the opposite-side operating sections 21 to 24 on the opposite side. Thus, generates potential differences, and by generating distance-dependent driving forces with the mirror-side operating regions, it is possible to perform driving as described above.

Instead of providing the second mirror-side operating regions and second opposite-side operating sections 21 and 22 at both ends in the driving direction of the mirror 10 as shown in FIG. 1, the operating sections may only be provided at one end. Even in the case where the operating sections are provided at one end in the driving direction of the mirror 10, the mirror 10 of the mirror device can be rotationally driven.

Although coulomb forces were used as the driving forces that are distance dependent in the embodiment described above, electromagnetic forces or the like may be used, for example.

In the case where electromagnetic forces are used, for example, when the distance-dependent driving forces are generated, a method that reverses the polarities (for example, north polarity with south polarity) of the mirror-side operating regions and the opposite-side operating sections may be used and when the distance-dependent driving forces are stopped, a method that sets the mirror-side operating regions and opposite-side operating sections at the same polarities (for example, north polarity with north polarity, and south polarity with south polarity) may be used.

The mirror device according to the present invention can be installed in a variety of electronic instruments, such as a router or a projector, other than an optical switch for switching an optical path according to the tilting of a mirror.

In addition, although a so-called parallel-plate electrostatic actuator system is used in the embodiment described above, at least one of the silicon substrate 1 and the glass substrate 2 may be tilted and instead of the glass substrate 2 on which the electrodes are disposed having a step-like shape, the position of the mirror 10 may be formed at a deepest part of V-shape.

Although the glass substrate 2 is described as having a step-like shape in the embodiment described above, the glass substrate 2 may be formed as a flat plate and the silicon substrate 1 may be formed as a step-like shape.

In addition, the driving method of the mirror 10 is not limited to rotational driving, and the present invention is also effective for a driving method where the mirror 10 moves up and down and the optical path is switched according to the position of the mirror 10, for example.

What is claimed is:

1. A mirror device comprising a mirror substrate having a mirror which is driven by a predetermined distance-dependent driving force and a support substrate which supports the mirror substrate, wherein the mirror substrate includes:
  at least one first mirror-side operating region on which the distance-dependent driving force acts, the first mirror-side operating region being integrally formed with the mirror and provided at a different position from the mirror; and
  at least one second mirror-side operating region on which the distance-dependent driving force acts, the second mirror-side operating region being provided at least one of one end of the mirror in a direction in which the mirror is driven and an opposite end of the mirror that is opposite the one end, wherein the support substrate includes:
  at least one first opposite-side operating section, the distance-dependent driving force acting between the first opposite-side operating section and the first mirror-side operating region; and at least one second opposite-side operating section, the distance-dependent driving force acting between the second opposite-side operating section and the second mirror-side operating region, wherein the first and second mirror-side operating regions and the first and second opposite-side operating sections are formed so that an attractive force is generated as at least part of the distance-dependent driving force, and wherein at least one of the mirror substrate and the support substrate is formed so that a gap between the first mirror-side operating region and the first opposite-side operating section is narrower than a gap between the second mirror-side operating region and the second opposite-side operating section.

2. The mirror device as defined in claim 1, wherein the first and second mirror-side operating regions and the first and second opposite-side operating sections are formed so that generation of an attractive force that is generated between the first mirror-side operating region and the first opposite-side operating section stops in order to restore a part of the mirror substrate other than the mirror to an original position, in a state that an attractive force is acting between the second mirror-side operating region and the second opposite-side operating section.

3. The mirror device as defined in claim 1, wherein the support substrate is formed as a step-like shape so that the gap between the first mirror-side operating region and the first opposite-side operating section is narrower than the gap between the second mirror-side operating region and the second opposite-side operating section.

4. The mirror device as defined in claim 1, wherein a plurality of the first mirror-side operating regions are disposed at a predetermined interval in a direction intersecting with a direction in which the mirror is driven, and wherein a gap between the first mirror-side operating region positioned farthest from the mirror and corresponding one of the first opposite-side operating sections is narrower than a gap between the first mirror-side operating region positioned closest to the mirror and corresponding one of the first opposite-side operating sections, so that a gap between the second mirror-side operating region and the second opposite-side operating section is gradually narrowed by causing an attractive force to act between the first mirror-side operating regions and the first opposite-side operating sections in order from the first mirror-side operating region positioned farthest from the mirror to the first mirror-side operating region positioned closest to the mirror.

5. The mirror device as defined in claim 1, wherein the mirror substrate includes a rotational shaft portion which is integrally formed with the mirror and rotatably supports the mirror, and wherein a plurality of the first mirror-side operating regions are formed on an axis of the rotational shaft portion on two opposed sides of the mirror.

6. The mirror device as defined in claim 1, wherein the distance-dependent driving force is a coulomb force.

7. The mirror device as defined in claim 1, wherein at least one of the first and second mirror-side operating regions and the first and second opposite-side operating sections are electrodes.

8. The mirror device as defined in claim 1, wherein the mirror substrate is a conductive silicon substrate.

9. An optical switch having the mirror device as defined in claim 1 and switching an optical path by driving the mirror.

10. An electronic instrument including the mirror device as defined in claim 1.

* * * * *